(12) United States Patent
Doran

(10) Patent No.: US 8,118,635 B2
(45) Date of Patent: Feb. 21, 2012

(54) ENCLOSED VAPOR PRESSURE OSCILLATION DEVICE

(76) Inventor: Edward Doran, Chicago, IL (US)

( * ) Notice: Subject to any disclaimer, the term of this patent is extended or adjusted under 35 U.S.C. 154(b) by 1164 days.

(21) Appl. No.: 11/872,035

(22) Filed: Oct. 14, 2007

(65) Prior Publication Data

US 2008/0213737 A1    Sep. 4, 2008

Related U.S. Application Data

(60) Provisional application No. 60/868,337, filed on Dec. 2, 2006.

(51) Int. Cl.
*A63H 29/14* (2006.01)
*A63H 29/00* (2006.01)
(52) U.S. Cl. .................. 446/167; 446/176; 434/283
(58) Field of Classification Search .................. 446/166, 446/167, 179, 199, 267; 434/283, 298; 40/675
See application file for complete search history.

(56) References Cited

U.S. PATENT DOCUMENTS

| | | | |
|---|---|---|---|
| 250,821 A | 12/1881 | Landis | |
| 253,868 A | 2/1882 | Iske | |
| 271,639 A | 2/1883 | Iske | |
| 2,240,906 A | 6/1941 | Harold | |
| 2,398,471 A | 4/1946 | Short et al. | |
| 2,402,463 A | 6/1946 | Sullivan | |
| 4,074,534 A * | 2/1978 | Morgan | 60/675 |
| 7,150,670 B2 | 12/2006 | Doran | |

* cited by examiner

*Primary Examiner* — Kien Nguyen
(74) *Attorney, Agent, or Firm* — Husch Blackwell LLP

(57) ABSTRACT

A mechanical toy having two enclosed chambers, one positioned above the other, connected by a tube; a vaporizing medium contained within the enclosed chambers and tube; means for rotationally supporting the tube and chambers; means for exciting the vaporizing medium within the lower chamber to create an increase in vapor pressure within the lower chamber relative to the upper chamber that exerts force upon the vaporizing medium within the lower chamber to communicate the vaporizing medium through the tube into the upper chamber allowing gravity to act upon the upper chamber when a sufficient amount of the vaporizing medium has collected within the upper chamber pulling the upper chamber downward around the means of rotational support.

5 Claims, 4 Drawing Sheets

ENCLOSED VAPOR PRESSURE OSCILLATION DEVICE

BACKGROUND OF THE INVENTION

1. Field of the Invention

This invention relates in general to a heat engine, and in particular to an engine that transforms heat energy partially into rotating mechanical energy with the assistance of gravity useful in actuating amusement and demonstrating concepts of physics for the purpose of education.

2. Description of the Prior Art

In order to provide background information so that the invention may be completely understood and appreciated in its proper context, reference is made to prior art U.S. patent Numbers in the following paragraphs.

My prior U.S. Pat. No. 7,150,670 discloses a two chamber rotational device that employs asymmetric chamber construction to provide 360-degree unidirectional rotation. The present invention differs from the prior art by utilizing asymmetric chamber construction to provide oscillating rotation upon repeated rotation intervals.

U.S. Pat. Nos. 2,402,463; 2,240,906 and 2,398,471 all disclose two chamber novelty power devices capable of partial rotation oscillating about an axis, which operation is effected by evaporative cooling and ambient air temperature. These inventions do not provide an axis that permits full 360-degree rotation, nor do they utilize asymmetric chamber construction as the means to make repeated cycles consistently produce 180-degree or near 180-degree oscillating rotation, nor do they employ the explicit application of an external energy source, in the form of heat, for more clearly demonstrating the concepts of physics employed for device operation, as does the present invention.

Within the prior art there are many examples of two chamber heat engines that create an oscillating motion. Included in this list are U.S. Pat. Nos. 250,821; 253,868 and 271,639. The present invention differs from the prior art in that the present invention utilizes an axis that permits full 360-degree rotation and asymmetric chamber construction as the means to make repeated cycles consistently produce 180-degree or near 180-degree oscillating rotation.

Whatever the precise merits, features and advantages of the above cited references, none of them achieves or fulfills the purposes of the explicit application of an external heat source to consistently provide 180-degree or near 180-degree oscillating device rotation about an axis to actuate amusement and more clearly demonstrate concepts including but not limited to the first and second laws of thermodynamics, Charles' and Boyle's gas laws, the law of gravity, the dynamics of rotational motion and fluid mechanics as does the present invention.

Accordingly, it is a principal object of the present invention to provide an oscillating rotation device for amusement and education in the field of science.

It is a further object of the present invention to provide 180-degree or near 180-degree device rotation about an axis.

It is a further object of the present invention to provide consistent oscillating rotation about an axis.

It is a further object of the present invention to provide consistent 180-degree oscillating or near 180-degree device rotation about bearing points that permit 360-degrees of freedom for rotation.

It is a further object of the present invention to achieve device rotation with a minimum of one tube connecting a pair of enclosed reservoirs.

It is another object of the present invention to provide the explicit application of an external energy source, in the form of heat, to generate device rotation.

SUMMARY OF THE INVENTION

This invention relates to an enclosed two chamber rotating device with 360-degrees of rotational freedom that provides oscillating rotation useful in actuating amusement and demonstrating concepts of physics for the purpose of education.

Specifically this device is shown as an enclosed hollow structure with two divided spaces or chambers connected by an elongated hollow member, in the form of a tube, which extends to an appropriate distance into the interior of each said space. An axis of rotation is maintained between the two spaces perpendicular to the connecting hollow member. The device is arranged in such a manner that one space is located above the other. The spaces are asymmetric in relation to a vertical plane running lengthwise through the axis of rotation and the two spaces. Initially the lower space will contain a majority of a vaporizing medium in liquid form. A heat source is maintained at the lower space. The upper space being farther from the heat source will have a lower temperature than the lower space. The heat source at the lower space will excite the liquid within the lower space producing an increase in vapor pressure within the lower space relative to the upper space. The increase in vapor pressure will exert force upon the liquid within the lower space to communicate the liquid through the connecting hollow member into the upper space. When a sufficient amount of liquid has collected in the upper space, the upper space will contain more mass than the lower space. The asymmetry of the upper space will cause the liquid to collect in an off center manner creating an imbalance within the upper space. Gravity acting upon the upper space will pull it downward around the axis of rotation in the direction of the imbalance effectively switching the positions of the upper and lower spaces, hereafter referred to as a cycle. The device is configured in such a way as to ensure that the imbalance occurs on alternate sides of the vertical plane at each cycle. Multiple cycles produce oscillating rotation of the device.

With the above and such other objects in view, as may hereinafter more fully appear, the invention consists of novel construction, combination and arrangement of parts, as will be hereinafter more fully described, and illustrated in the accompanying drawing, wherein are shown embodiments of this invention, but it is to be understood that changes, variations, and modifications may be resorted to which fall within the scope of the invention, as described.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION

Figure 1:
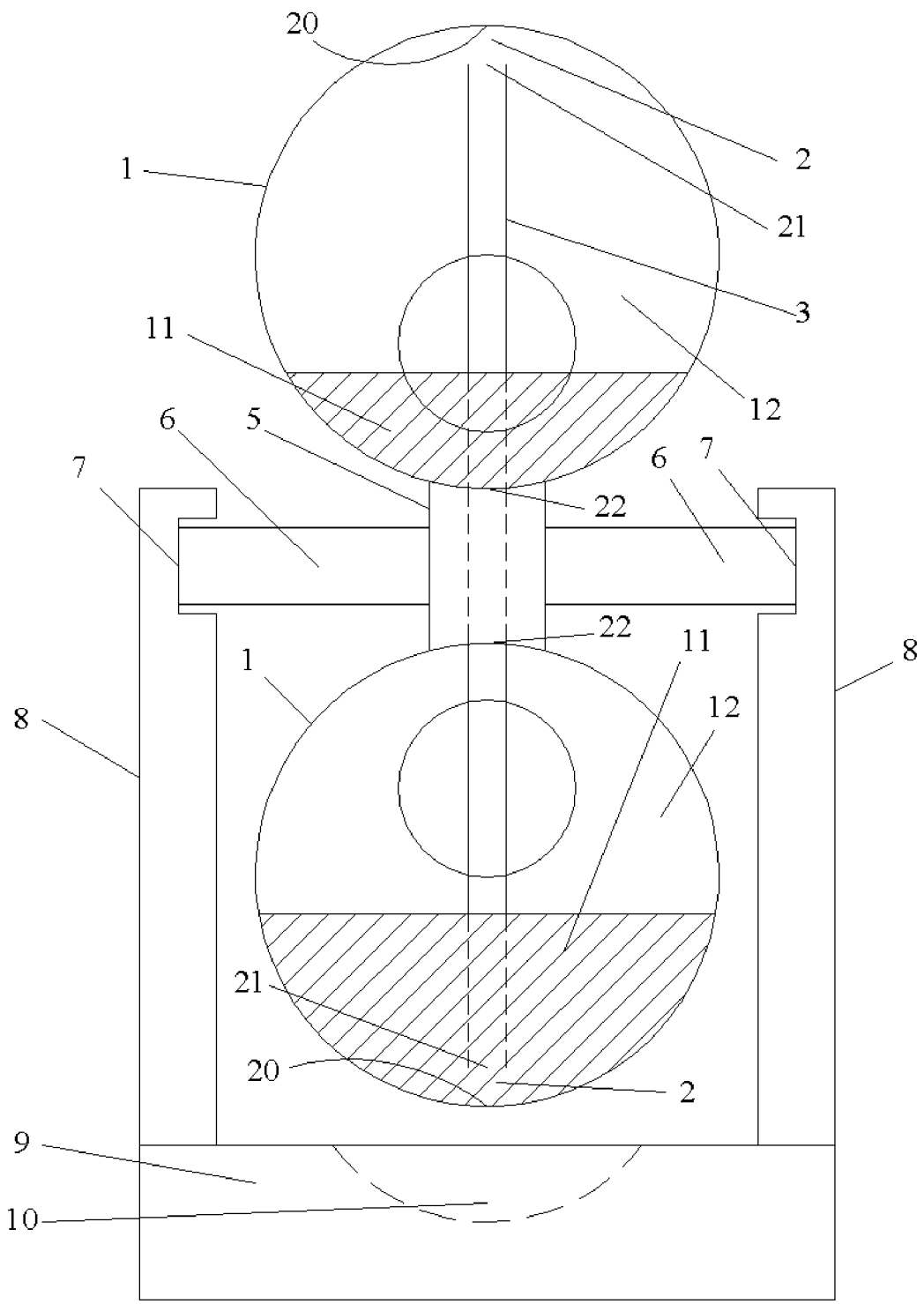
FIG. 1 is a frontal view of an enclosed vapor pressure oscillation device in which a hollow member connects two enclosed chambers one above the other each partially filled with a liquid.

A preferred embodiment of the present invention will now be described in connection with FIGS. 1 and 2 of the drawing followed by alternate embodiments with FIGS. 3 and 4 of the drawing.

As shown in FIG. 1 two enclosed chambers 1 also referred to as reservoirs are presented one above the other. By convention the same number is used to identify parts that are identical; for example, the number one is used to identify both the upper and lower chambers. A hollow member 3, in the form of a tube, connects the two chambers. The hollow member extends into each chamber allowing for only a small distance 2 between the open ends 21 of the hollow member and the internal surface 20 of each chamber away from the points of entry 22 into each chamber by the hollow member. A vaporizing medium in the form of a liquid 11 within the lower chamber when heated by a heat source 10 about a base 9 will excite the liquid and increase the vapor pressure within the enclosed space 12 of the lower chamber relative to that which exists within the enclosed space of the upper chamber. The said small distance between the internal surface of the chamber and the open end of the hollow member permits the open end to remain substantially submerged within the liquid to ensure a majority of the liquid is communicated through the hollow member from the lower chamber to the upper chamber as the vapor pressure increases within the lower chamber exerting force upon the liquid within the lower chamber. When a substantial amount of the liquid collects in the upper chamber, gravity acting upon the upper chamber will pull the upper chamber downward around a supporting rotational shaft that defines the axis of rotation 6 switching the positions of the upper and lower chambers. The shaft is connected about its center to the hollow member between the two enclosed chambers 5. The shaft is connected at its ends to bearing points 7 that provide 360-degrees of rotational freedom that are supported by arms 8 connected to the base.

The hollow member and enclosed chambers are preferably comprised of a light transmissive material, such as heat and shatter resistant glass or silica, to promote easy observation of the physical phenomena. The heat source is preferably comprised of a light bulb, such as a 10 to 40 watt incandescent or halogen bulb, to simultaneously illuminate the device while providing heat. The vaporizing medium in the form of a liquid is preferably comprised of material with a low boiling point such as ethanol alcohol or acetone and more preferably of a non-flammable material with said low boiling point such as methylene chloride. The enclosed space within the chambers and connecting hollow member is preferably initially substantially evacuated of air before introducing the vaporizing medium in order to provide vaporization at relatively lower temperatures.

Figure 2:
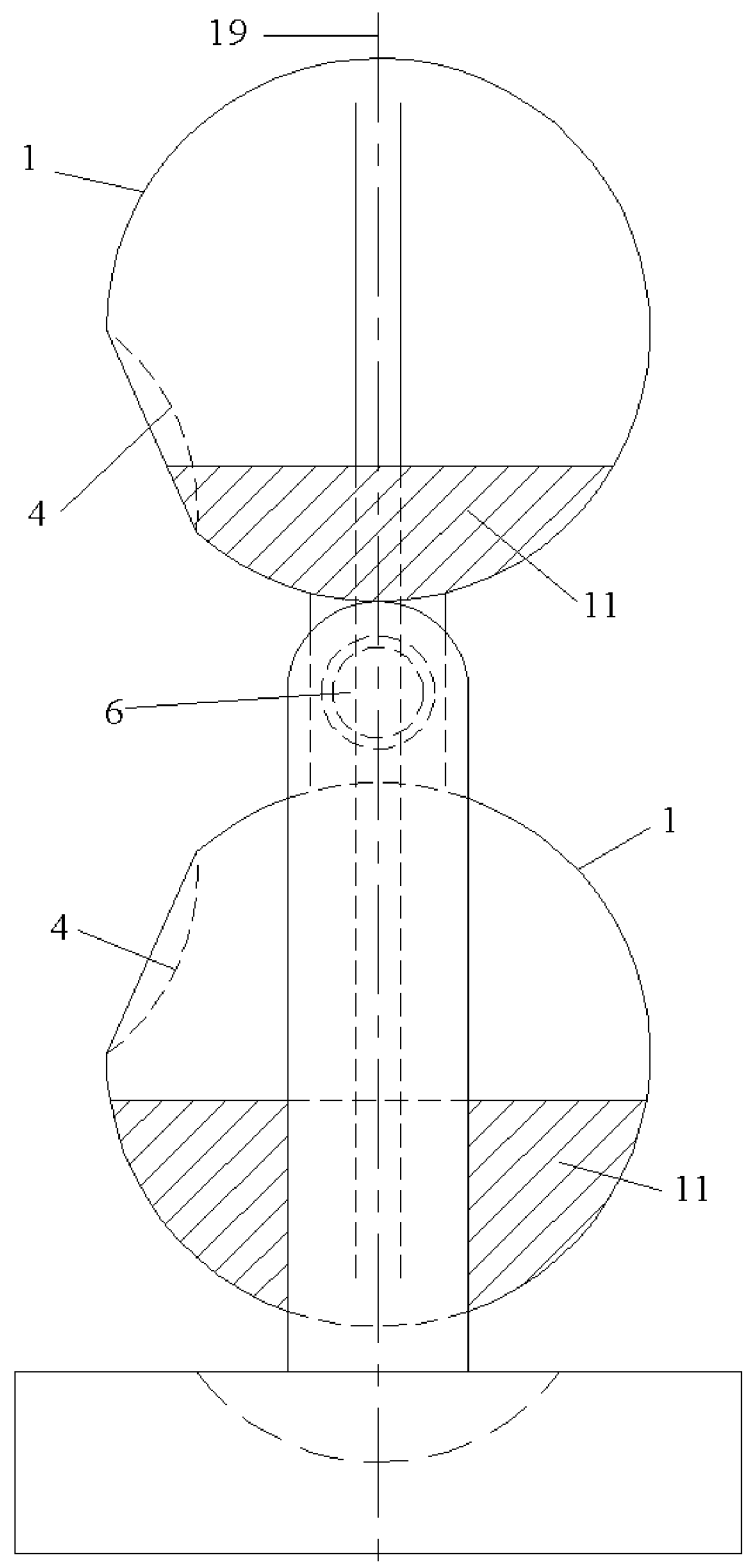
FIG. 2 is a side view of an enclosed vapor pressure oscillation device illustrating an asymmetric chamber shape with respect to a vertical plane running through the two chambers.

FIG. 2 depicts the side view of the device to illustrate an asymmetric chamber shape with respect to a vertical plane 19 running lengthwise through a rotational shaft that defines the axis of rotation 6 and chambers 1, in the form of a dimple 4 to one side of each chamber. One chamber is positioned above the other. As a substantial amount of vaporizing medium in the form of a liquid 11 collects in the upper chamber by means described within the preceding paragraphs, more liquid will be situated to one side of the vertical plane than the other as a result of the asymmetric shape creating a weight imbalance. Gravity acting upon the imbalance within the upper chamber will create a moment of rotational force in the direction of the heavier side of the chamber. The rotational force pulls the upper chamber downward around the axis of rotation switching the position of the upper and lower chambers, referred to as a cycle. Each chamber is configured in such a way as to ensure that the imbalance occurs on alternate sides of the vertical plane at each cycle to produce oscillating rotation.

Figure 3:
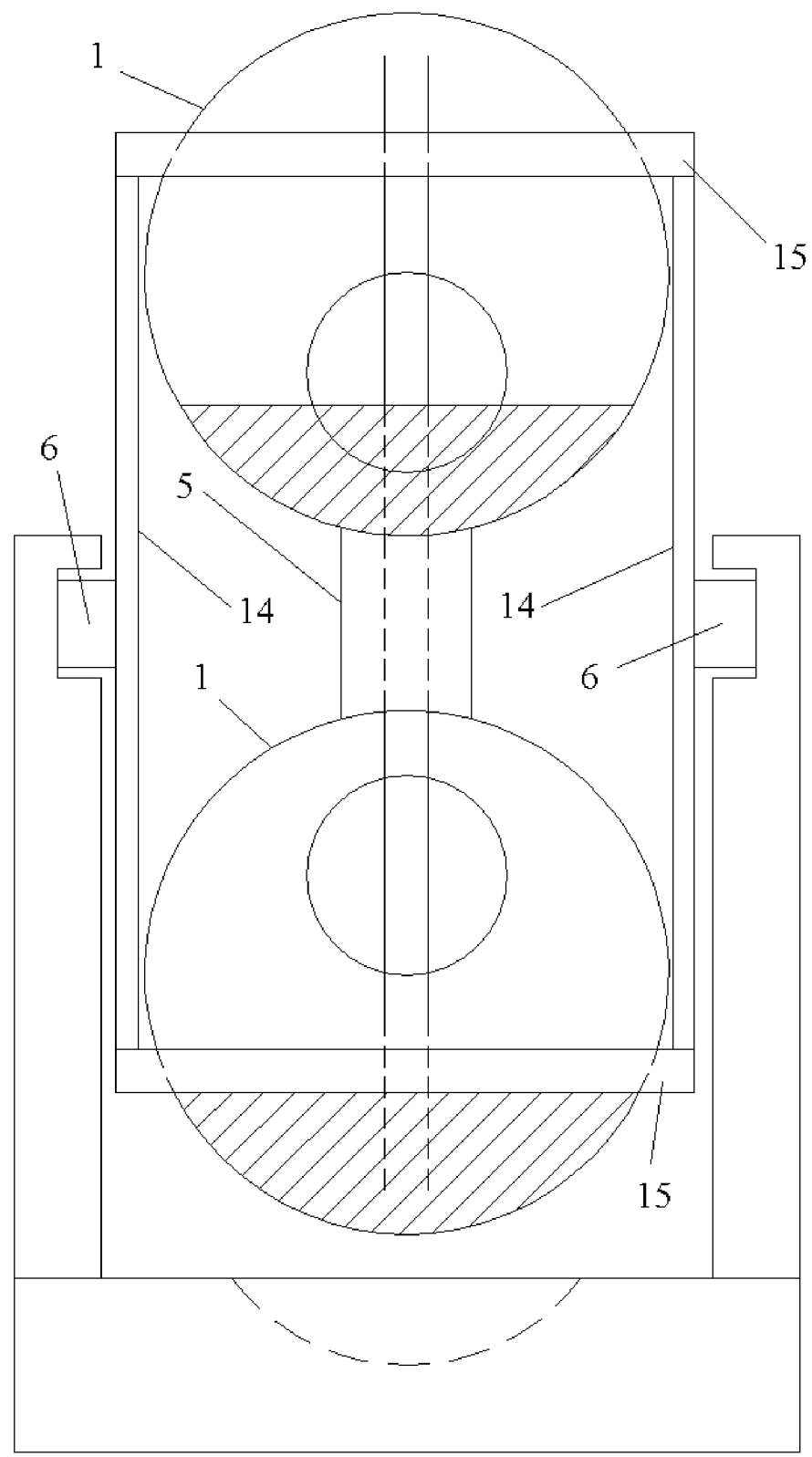
FIG. 3 is a frontal view of an alternate embodiment of an enclosed vapor pressure oscillation device in which a shaft that defines the axis of rotation is maintained between the two chambers but not directly attached to the connecting hollow member.

FIG. 3 is a frontal view of an alternate configuration of an enclosed vapor pressure oscillation device in which a rotational shaft that defines the axis of rotation 6 is connected to support arms 14 that are attached to connectors 15 affixed to each of the enclosed chambers 1. The figure illustrates the shaft maintained between the two chambers need not be directly attached to the connecting hollow member between the two chambers 5 for device operation.

Figure 4:
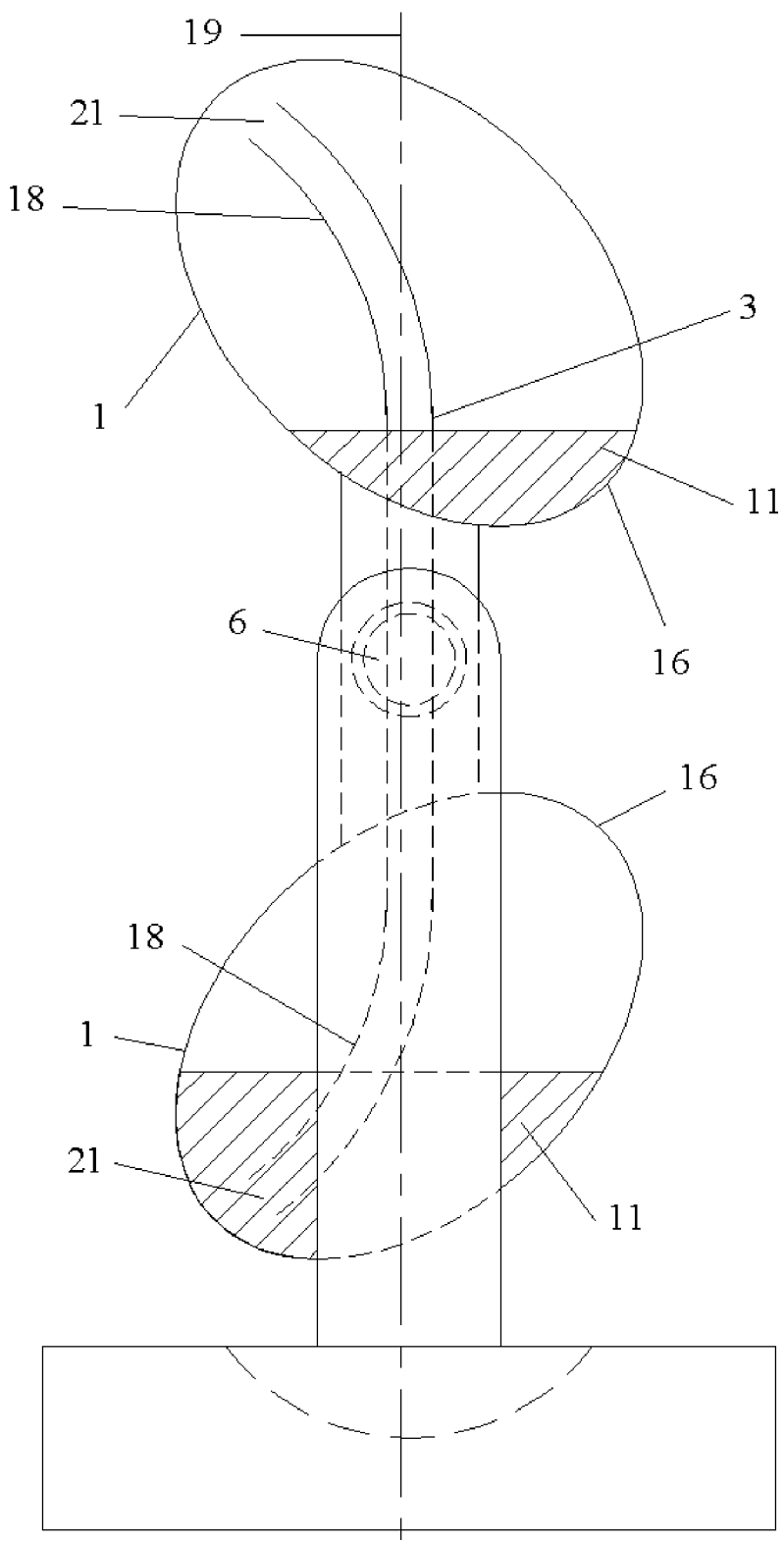
FIG. 4 is a side view of an alternate embodiment of an enclosed vapor pressure oscillation device that illustrates an asymmetric chamber form with respect to a vertical plane running through the two chambers in which cavities protrude outward from each chamber instead of inward in addition to a bend in the connecting hollow member within each chamber.

FIG. 4 is a side view of an alternate configuration of an enclosed vapor pressure oscillation device that illustrates an asymmetric form of the two chambers 1, one above the other, with respect to a vertical plane 19 running lengthwise through a rotational shaft that defines the axis of rotation 6 and said chambers in which outward facing bulges 16 closest to the axis of rotation toward the center of the device permit more vaporizing medium in the form of a liquid 11 to fill the upper chamber to one side of the vertical plane creating a weight imbalance when a substantial amount of the liquid collects in the upper chamber by means described within the preceding paragraphs. The chambers are configured in such a way as to ensure that the weight imbalance occurs on alternate sides of the vertical plane at each cycle as previously described to produce oscillation. The drawing also illustrates a bend 18 in the connecting hollow member 3 within each chamber that enables more liquid to be communicated through the hollow member by allowing the end of the hollow member 21 to remain submerged within the liquid slightly longer during rotation.

The foregoing explanation of a preferred embodiment and alternate embodiments of the invention has been presented for the purposes of illustration and description. It is not intended to be exhaustive or limit the invention to the precise form disclosed. Many modifications and variations are possible in light of the above teaching.

What is claimed is:

1. An educational mechanical device comprising a pair of enclosed chambers connected by a tube extending into each said chamber wherein said chambers are positioned in such a way that one chamber is situated above the other; a rotational shaft centrally connected to said chambers and tube defining an axis of rotation of the two chambers around the rotational shaft; a vaporizing medium contained within said enclosed chambers and tube; support arms connected at each end of said rotational shaft at bearing points to that provide 360-degrees of rotational freedom; a base secured to said support aims below said bearing points; a heat source about said base to excite said vaporizing medium within said lower chamber and create an increase in vapor pressure within said lower chamber relative to said upper chamber that exerts force upon the vaporizing medium within the lower chamber to communicate the vaporizing medium through said tube into the upper chamber; said chambers are each asymmetrically constructed with respect to a vertical plane running lengthwise through said chambers and rotational shaft to ensure that when the vaporizing medium collects in the upper chamber a weight imbalance occurs; when a substantial amount of the vaporizing medium collects in the upper chamber creating the weight imbalance within the upper chamber gravity acting upon the upper chamber pulls the upper chamber downward around the axis of rotation creating rotation in the direction of the weight imbalance effectively switching the position of said upper chamber with said lower chamber; said heat source acting upon said lower chamber creates repeat rotation; the asymmetrically constructed chambers are configured in such a way as to ensure that the imbalance occurs on alternate sides of the vertical plane at each rotation to produce consistent 180-degree or near 180-degree oscillation about said bearing points that permit 360-degrees of freedom for rotation.

2. An educational mechanical device, set forth in claim 1, wherein said hollow member extends into each said chamber a distance just short of the internal surface of said chamber away from the point of entry of said chambers by said hollow member to provide maximum said communication of said vaporizing medium.

3. An educational mechanical device, set forth in claim 1, wherein said enclosed chambers and said connecting hollow member are substantially evacuated of air to provide a lower vaporizing temperature of said vaporizing medium.

4. An educational mechanical device comprising, two enclosed reservoirs, one designated as a lower reservoir and the other as an upper reservoir; a hollow member extending into each said reservoir connecting said reservoirs to each other; a rotational shaft centrally connected to said reservoirs and hollow member defining an axis of rotation of the two reservoirs around the rotational shaft; a vaporizing medium contained within said enclosed reservoirs and hollow member; support arms connected at each end of said rotational shaft at bearing points that permit 360-degrees of freedom for rotation; a base secured to said support arms below said bearing points; said reservoirs are asymmetrically constructed with respect to a vertical plane running lengthwise through said rotational shaft and reservoirs to ensure that when the vaporizing medium collects in the upper reservoir a weight imbalance occurs on alternate sides of said vertical plane regardless of which chamber is positioned above; a heat source about said base to excite said vaporizing medium within said lower reservoir and create an increase in vapor pressure within said lower reservoir relative to said upper reservoir that exerts force upon the vaporizing medium within the lower reservoir to communicate the vaporizing medium through said hollow member into the upper reservoir; when a substantial amount of the vaporizing medium collects in the upper reservoir creating the weight imbalance within the upper reservoir gravity acting upon the upper reservoir pulls the upper reservoir downward around the axis of rotation creating rotation in the direction of the weight imbalance effectively switching the position of said upper reservoir with said lower reservoir; said heat source acting upon said lower reservoir creates 180-degree or near 180-degree oscillation upon repeated rotations.

5. An educational mechanical device, set forth in claim 4, wherein said tube and said reservoirs are comprised of a light transmissive material to promote easy observation of the physical phenomenon.

* * * * *